(12) United States Patent
Meyer

(10) Patent No.: US 11,402,154 B1
(45) Date of Patent: Aug. 2, 2022

(54) FUEL GAS CONDITIONING

(71) Applicant: James M. Meyer, Golden, CO (US)

(72) Inventor: James M. Meyer, Golden, CO (US)

( * ) Notice: Subject to any disclaimer, the term of this patent is extended or adjusted under 35 U.S.C. 154(b) by 413 days.

(21) Appl. No.: 16/785,082

(22) Filed: Feb. 7, 2020

(51) Int. Cl.
*B01D 53/02* (2006.01)
*F25J 1/00* (2006.01)
*B01D 53/26* (2006.01)
*B01D 53/00* (2006.01)
*F02M 21/02* (2006.01)

(52) U.S. Cl.
CPC .......... *F25J 1/0035* (2013.01); *B01D 53/002* (2013.01); *B01D 53/26* (2013.01); *F25J 1/0022* (2013.01); *F25J 1/0082* (2013.01); *B01D 2257/702* (2013.01); *B01D 2257/80* (2013.01); *B01D 2259/65* (2013.01); *F02M 21/0209* (2013.01); *F25J 2205/02* (2013.01); *F25J 2205/30* (2013.01); *F25J 2210/60* (2013.01); *F25J 2290/12* (2013.01)

(58) Field of Classification Search
CPC ...... F24J 1/0035; B01D 53/002; B01D 53/26; B01D 2257/702; B01D 2257/80; B01D 2259/65; F25J 1/0022; F25J 1/0082; F25J 2205/02; F25J 2205/30; F02M 21/0209
See application file for complete search history.

(56) References Cited

U.S. PATENT DOCUMENTS

| | | | | |
|---|---|---|---|---|
| 6,272,882 | B1* | 8/2001 | Hodges | F25J 1/0052 |
| | | | | 62/619 |
| 2004/0083888 | A1* | 5/2004 | Qualls | C10L 3/10 |
| | | | | 95/227 |
| 2006/0131218 | A1* | 6/2006 | Patel | C10G 2/344 |
| | | | | 585/800 |
| 2011/0167868 | A1* | 7/2011 | Pierce | F25J 3/0209 |
| | | | | 62/620 |
| 2016/0231052 | A1* | 8/2016 | Mak | F25J 3/0233 |
| 2017/0191753 | A1* | 7/2017 | Mak | F25J 3/064 |
| 2018/0016977 | A1* | 1/2018 | Nagavarapu | F25J 3/0645 |
| 2019/0049176 | A1* | 2/2019 | McCool | F25J 3/0242 |
| 2019/0225891 | A1* | 7/2019 | Suppiah | F25J 3/061 |
| 2020/0284507 | A1* | 9/2020 | McCool | C10L 3/10 |
| 2020/0370823 | A1* | 11/2020 | Butts | F25J 1/0288 |
| 2021/0088274 | A1* | 3/2021 | Liu | F25J 1/0207 |

\* cited by examiner

*Primary Examiner* — Christopher P Jones

(57) ABSTRACT

Compressed rich natural gas is divided into a cooling gas stream and a fuel gas stream. The cooling gas stream is depressurized. The cooling gas and the fuel gas are then heat exchanged to provide a first cooling step to the fuel gas. The cooled fuel gas continues into a second cooling step in a second heat exchanger, and then flows into a separator vessel where liquids are removed from the bottom of the separator and conditioned fuel gas exits the top of the separator. The conditioned fuel gas from the separator and produced from its influent is depressurized and heat exchanged to provide the second cooling fluid for the second heat exchanger.

5 Claims, 1 Drawing Sheet

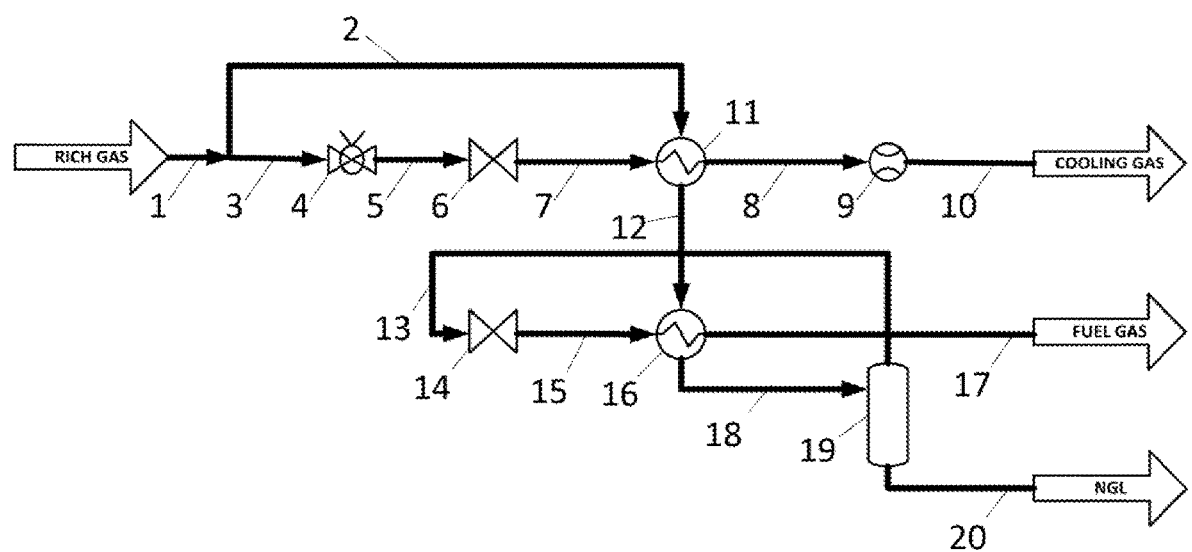

FUEL GAS CONDITIONING

FIELD OF THE INVENTION

The invention relates generally to conditioning of rich natural gas to a lean gas suitable for use as a fuel in internal combustion engines.

BACKGROUND

Compression of natural gas is ubiquitous to the energy industry. Many compressors are now taxed with processing rich natural gas—gas that contains methane but also higher molecular weight compounds such as ethane, propane, butane, and even higher molecular weight hydrocarbons. The aforementioned hydrocarbons are collectively referred to as natural gas liquid (NGL). Rich natural gas has become common as a result of horizontal drilling and fracking because natural gas is co-produced with oil.

Most compressors used for gas processing are powered by a natural gas engine. Most of these engines are designed to operate on lean natural gas—gas with a gross BTU content of less than 1200 BTU per standard cubic foot. When rich natural gas is used, the engines will knock and operate at higher temperature. Consequently, rich natural gas reduces the life of the engine and increases maintenance costs. Compressor operators often change the tuning of the engine to mitigate the effects of the rich natural gas, thereby decreasing the horsepower of the engine and reducing the throughput of the compressor.

Rich natural gas can be conditioned to produce lean natural gas suitable for fuel use by compressing and cooling the rich gas, thereby removing NGL. Common solutions to condition the gas for fuel involve processes where the gas is compressed and cooled to remove NGL. Specifically, mechanical refrigeration and Joule Thompson cooling are commonly used. Mechanical refrigeration is typically not cost-effective to process the small amount of gas used by the compressor engine. Mechanical refrigeration is also bulky and difficult to move from site to site as is often needed in oil fields. Joule Thompson systems are commonly used but have the drawback of producing an emulsified NGL/water byproduct that is difficult to sell.

SUMMARY

A fuel gas conditioning (FGC) process described herein conditions rich natural gas (RNG) for use as a motor fuel for combustion in an engine. The motor fuel is also referred herein as a lean gas, a fuel gas, and a lean fuel gas. In the FGC process, compressed RNG is divided into two streams. One RNG stream eventually becomes the fuel gas for the engine. The other stream is used as a cooling gas stream that is expanded to pre-cool the fuel gas in a first heat exchanger before being treated by a scrubber. Overall, a single input stream is converted into two, three, or more streams by the system. A cooling gas stream flow rate is controlled by a flow control valve upstream of the first heat exchanger. The cooling gas stream exits the heat exchanger and is recycled to a compressor.

The fuel gas then flows through a second heat exchanger for a second cooling step. The cooled fuel gas stream then contains both natural gas and natural gas liquid (NGL) and this fuel gas stream is separated into at least two streams by a fuel gas scrubber. One benefit includes separation that occurs without depressurization and this separation precludes emulsification of water and NGL. The cold side of the second heat exchanger is the expanded gas from a fuel gas scrubber. The second heat exchanger performs at least two functions. First, expanded fuel gas is heated to be used as engine fuel. Second, the fuel gas to the scrubber is cooled for improved liquids removal which simultaneously lowers the BTU content of the fuel gas.

BRIEF DESCRIPTION OF THE DRAWINGS

FIG. 1 is a process flow diagram for a system, according to some embodiments, to transform rich gas to lean fuel gas suitable for an internal combustion engine whereby rich natural gas is first cooled in a heat exchanger cooled by cooling gas, followed by a gas expansion cooler, and then a two-phase separator.

DETAILED DESCRIPTION

Referring to FIG. 1, a rich natural gas at a pressure of approximately 500 to 1000 PSI and at a temperature of about 50 to 120° F. serves as a feed stream 1 for the fuel gas conditioning (FGC) system. While illustrated in FIG. 1 as a solitary system, the FGC system can serve as part of a larger processing system or process. In some embodiments, the rich natural gas feed stream 1 includes water in addition to methane and heavier hydrocarbons. In the FGC system, the feed stream 1 including the rich natural gas is split into a fuel gas stream 2 and a cooling gas stream 3. The flow rate of the cooling gas stream 3 is measured by a flow control valve 4. The flow rate is either a mass flow rate or a volume flow rate and control in the system is based on either of these types of rates. A cooling gas stream 5 exits the flow control valve 4 and subsequently flows through a depressurization valve 6. A depressurized stream 7 exits the depressurization valve 6 at about 50 PSI and about 30° F. according to some embodiments. The depressurization valve 6 is also referred to as a cooling gas valve. The depressurized stream 7, referred to as a cooling gas stream 7, flows through a cold side of a first heat exchanger 11 where the cooling gas is warmed to around 50 to 100° F. according to some embodiments. The depressurization valve 6 is one example of one or more components used for depressurizing the cooling gas stream 5 ahead of the first heat exchanger 11. Although a single valve 6 is illustrated in FIG. 1, in some embodiments, multiple components are used in place of the depressurization valve 6 to expand the cooling gas stream 5 ahead of subsequent operations to produce a lean fuel gas.

The warmed cooling gas stream 8 then flows into a flow meter 9, which measures a flow rate through the flow control valve 4 and, in some embodiments, provides an input control signal to facilitate control of the flow control valve 4. In other embodiments, the flow meter 9 may be positioned along stream 3, 5 or 7. While not illustrated, it is understood that the system may include a control subsystem that facilitates control of the flow control valve 4 with one or more input control signals such as from the flow meter 9. Downstream of the first heat exchanger 11, a cooling gas stream 10 exits the flow meter 9 and is then either recycled to a compressor (not illustrated) for use in this system or another system or is combusted depending on one or more economic or physical conditions of the system and prevailing (e.g., operational, economic) conditions of the system. Generally, the exiting cooling gas stream 10 leaves the system at approximately 50 PSI and over 30° F.

The fuel gas stream 2 flows through a hot side of the cooling gas heat exchanger 11. The first cooled fuel gas stream 12 exits at about 20 to 80° F. from the first heat exchanger 11 and then flows into a hot side of a second heat exchanger 16. In some embodiments, although not illustrated, at or after the first heat exchanger 11, the system includes one or more temperature or pressure sensors operationally coupled to the warmed cooling gas stream 8 or the resulting cooling gas stream 10 for control or monitoring of a property of the cooled fuel gas stream 12 and for operation of the flow control valve 4. For example, a component of the first heat exchanger 11 is manipulated based on such sensor to maintain a desired property of the cooled fuel gas stream 12. As another example, an amount of a fraction of the feed stream 1 is diverted by the flow control valve 4 into the cooling gas stream 3 based on a desired (target) condition or a desired (target) property of the cooled fuel gas stream 12 or a desired (target) condition of another component in the system (e.g., fuel gas scrubber 19 or effluent or influent of the same). While the system includes the second heat exchanger 16, in some alternative embodiments, the two heat exchangers 11, 16 are combined and take the form of a partitioned heat exchanger that avoids the stream 12 between them. Instead, a single partitioned heat exchanger has two cold sides and thereby accepts two cold input streams 7, 15 and has a single effluent.

In FIG. 1, a second cooled fuel gas stream 18 exits the second heat exchanger 16 at about 10° F., and then flows from the second heat exchanger 16 and enters a fuel gas scrubber 19 where a fuel gas stream 13 is separated from a natural gas liquid (NGL) stream 20. The NGL stream 20 leaves with and includes a substantive portion of the liquid components fed into and subsequently exiting the scrubber 19 at the conditions (e.g., temperature and pressure) at a corresponding bottom exit of the scrubber 19. The NGL stream 20 is also referred to herein as a bottom stream of the scrubber 19.

In some embodiments, and as illustrated, from the top of the scrubber 19, the fuel gas stream 13 flows through a second depressurization valve 14, thereby reducing the pressure of stream 15 to about 50 PSI. As illustrated in FIG. 1, the entire fuel gas stream 13 flows out of the fuel gas scrubber 19 and through the second heat exchanger 16. In some embodiments, a fraction of the fuel gas stream 13 is depressurized and flowed through the second heat exchanger 16. The pressure reduction caused by depressurization valve 14 cools the stream 15 to a temperature of about −50° F., or at least below 10° F. Broadly, and by way of example, the stream 15 is cooled below −20° F. Fuel gas stream 15 then flows into the cold side of the fuel gas (second) heat exchanger 16. Conditioned fuel gas 17 at about 50 PSI and 50° F. from the fuel gas heat exchanger 16 leaves the system as a conditioned gas suitable for use as a fuel in an internal combustion engine. Broadly, the conditioned fuel gas exits the system below 100 PSI and below 80° F. Although not illustrated, some embodiments of the fuel gas scrubber 19 also produce a third exit stream that is mostly water by composition, an aqueous effluent that includes substantially all of the water from the feed stream, rendering the conditioned fuel gas 17 substantially water free. This third stream is taken off of or near the bottom of the fuel gas scrubber 19.

I claim:

1. A method to condition fuel gas, the method comprising:
depressurizing a first fraction of a feed stream with a first depressurization valve (6);
passing the first fraction of the feed stream through a cold side of a first heat exchanger (11);
passing a second fraction of the feed stream through a hot side of the first heat exchanger; and
splitting an effluent from the hot side of the first heat exchanger into a lean fuel gas stream (17) and a natural gas liquid (NGL) stream (20) with a scrubber (19) wherein the scrubber is positioned downstream from the hot side of the first heat exchanger.

2. The method of claim 1, further comprising:
cooling a hot side effluent from the first heat exchanger with the lean fuel gas stream using a second heat exchanger (16) downstream from the first heat exchanger before the scrubber creates the lean fuel gas stream and the NGL stream.

3. The method of claim 2, further comprising:
depressurizing the lean fuel gas stream from the scrubber with a second depressurization valve (14) upstream of a cold side of the second heat exchanger.

4. The method of claim 3, wherein the second depressurization valve:
cools its effluent stream to a temperature below approximately −20° F.; and
reduces a pressure of its effluent stream to about below 100 PSI.

5. The method of claim 1, wherein the lean fuel gas stream exits the system below 100 PSI and below 80° F.

\* \* \* \* \*